(12) United States Patent
Chin et al.

(10) Patent No.: US 8,330,991 B2
(45) Date of Patent: Dec. 11, 2012

(54) METHOD FOR MANAGING METAMERISM OF COLOR MERCHANDISE

(75) Inventors: Bobby Chin, Sparta, NJ (US); Carl Minchew, Mountain Lakes, NJ (US); Patrick Tak Fu Chong, Mount Arlington, NJ (US); Anthony Joseph Calabria, Rockaway, NJ (US)

(73) Assignee: Columbia Insurance Company, Omaha, NE (US)

( * ) Notice: Subject to any disclaimer, the term of this patent is extended or adjusted under 35 U.S.C. 154(b) by 900 days.

(21) Appl. No.: 12/380,697

(22) Filed: Mar. 3, 2009

(65) Prior Publication Data

US 2010/0228511 A1   Sep. 9, 2010

(51) Int. Cl.
*H04N 1/60*   (2006.01)
*G03F 3/08*   (2006.01)
*G06K 9/00*   (2006.01)

(52) U.S. Cl. ............................. 358/1.9; 358/518; 382/167
(58) Field of Classification Search .................... 358/1.9, 358/1.15, 502, 501, 518, 520; 382/167, 165
See application file for complete search history.

(56) References Cited

U.S. PATENT DOCUMENTS

| | | | |
|---|---|---|---|
| 3,601,589 A * | 8/1971 | McCarty | ........................ 382/165 |
| 5,483,360 A | 1/1996 | Rolleston et al. | |
| 5,530,563 A * | 6/1996 | Zimmermann et al. | ....... 358/517 |
| 5,798,943 A * | 8/1998 | Cook et al. | .................... 382/162 |
| 5,929,906 A | 7/1999 | Arai et al. | |
| 6,330,342 B1 | 12/2001 | Winter et al. | |
| 6,698,860 B2 | 3/2004 | Berns et al. | |
| 6,741,260 B2 | 5/2004 | Hirayama et al. | |
| 6,843,840 B2 | 1/2005 | Kataoka et al. | |
| 6,849,110 B2 | 2/2005 | Sano | |
| 6,987,567 B2 | 1/2006 | Takahashi et al. | |
| 7,019,868 B2 | 3/2006 | Chang et al. | |
| 7,053,910 B2 | 5/2006 | Newman | |
| 7,583,420 B2 * | 9/2009 | Namikata | ..................... 358/518 |
| 2003/0144377 A1 | 7/2003 | Sano et al. | |
| 2005/0094169 A1 | 5/2005 | Berns et al. | |
| 2005/0094871 A1 * | 5/2005 | Berns et al. | .................... 382/162 |
| 2006/0181707 A1 | 8/2006 | Gibson et al. | |
| 2007/0263098 A1 | 11/2007 | Quan et al. | |
| 2007/0263265 A1 | 11/2007 | Sekine | |
| 2007/0292608 A1 | 12/2007 | Rodrigues | |

(Continued)

OTHER PUBLICATIONS

International Search Report and Written Opinion issued in connection with corresponding International Application No. PCT/IB2010/000831 on Sep. 23, 2010.

(Continued)

*Primary Examiner* — Madelein A Nguyen
(74) *Attorney, Agent, or Firm* — The H. T. Than Law Group

(57) ABSTRACT

The present invention relates to a method for minimizing the effects of metamerism between a set of color standards (e.g., nitrocellulose lacquers) and inkjet printed color merchandise (e.g., paint chips) under a plurality of illuminants, including a balanced illuminant that emulates lighting conditions between cool (6500 K) and warm (2856 K) color temperatures. For each color standard, one selects an ink combination that best produces color merchandise having a minimal degree of metamerism. Innovatively, a combination of instrumental and visual tests is used to evaluate color difference for a set of color standards-color merchandise pairs under a plurality of illuminants. If a color standard-color merchandise pair fails either test then the ink combination may be adjusted.

29 Claims, 8 Drawing Sheets

U.S. PATENT DOCUMENTS

| | | | |
|---|---|---|---|
| 2008/0017066 A1* | 1/2008 | Bauer et al. | 106/31.6 |
| 2008/0259600 A1 | 10/2008 | Pohlert | |
| 2008/0266563 A1 | 10/2008 | Redman et al. | |
| 2009/0019086 A1* | 1/2009 | Prakash et al. | 707/104.1 |
| 2009/0040564 A1* | 2/2009 | Granger | 358/2.1 |
| 2010/0067056 A1* | 3/2010 | Rich et al. | 358/2.1 |
| 2010/0142003 A1* | 6/2010 | Braun et al. | 358/3.28 |
| 2010/0194775 A1* | 8/2010 | Ou et al. | 345/594 |
| 2010/0194776 A1* | 8/2010 | Chong et al. | 345/594 |
| 2010/0225935 A1* | 9/2010 | Minchew et al. | 358/1.9 |

OTHER PUBLICATIONS

Mattias Andersson. "Topics in Color Measurement". Linkoping Studies in Science and Technology Licentiate Thesis 1143 [online], Dec. 2004. <http://www.t2f.nu/t2frapp_f_164.pdf>.

Imai et al., "Comparative Study of Metrics for Spectral Match Quality." CGIV 2002: The First European Conference on Colour Graphics, Imaging, and Vision. pp. 492-496.

Berns, Billmeyer and Saltzman's Principles of Color Technology, 3rd Edition, John Wiley and Sons, 2000. pp. 56-59, 107, and 124-128.

Taplin and Berns, "Spectral Color Reproduction Based on a Six-Color Inkjet Output System." IS&T/SID Ninth Color Imaging Conference. pp. 209-213.

Wyble and Berns, "A Critical Review of Spectral Models Applied to Binary Color Printing." Color Research and Application, vol. 25, No. 1, Feb. 2000. pp. 4-19.

International Color Consortium. Summary of CIE Publication 163: 'The effects of flourescence in the characterization of imaging media.'

Tzeng and Berns, "Spectral-Based Six-Color Separation Minimizing Metamerism." IS&T/SID Eighth Color Imaging Conference. pp. 342-347.

"Color Palette." The Free Dictionary. http://encyclopedia2. thefreedictionary.com/color%20palette>color paletts</a>. Retrieved Mar. 2, 2009.

Calibrated Lookup Tables for Pantone Licensed Printer Brother HL-4200 CN. http://www.pantone.de/pages/calibratedprinters/calibratedprinters.aspx. Retrieved Mar. 2, 2009.

Balaji S.R., et al. "Hierarchical Compression of Color Look Up Tables." 15th Color Imaging Conference Final Program and Proceedings. pp. 261-266.

* cited by examiner

METHOD FOR MANAGING METAMERISM OF COLOR MERCHANDISE

FIELD OF THE INVENTION

This invention generally relates to a method for minimizing the effects of metamerism among color merchandise produced from an inkjet printer, a color standard, and a commercially produced product such as paint.

BACKGROUND OF THE INVENTION

Before purchasing paints, buyers typically are given a fan deck or palette comprising hundreds or thousands of paint chips, which represent a small portion of the available paint colors. The paint chips can be created by variety of means including inkjet printing. The paint chips typically measure about 1¼ inch by 2 inches, and recently, buyers can purchase larger paint chips of about 18 inches by 18 inches to assist them with the mental projection of the colors to the walls. Additionally, the buyers may purchase small containers of about 2 ounces of the desired paints to paint larger swatches on the walls. Typically, the buyers start with small paint chips to narrow the choices and then move to larger paint chips and/or sample paints before choosing the final paint colors.

Color accurate, physical merchandise, which has a tactile dimension as well as color, is available in a nearly unlimited variety of shapes and sizes. These include the basic, single color chips described above, as well as strip chips, fan decks, designer decks, counter books, specialty collections and variations of all of these. The merchandise may be used by consumers or design professionals and may appear in retail stores, kiosks, design centers or be available for sale through stores or via the internet. All of this physical color merchandise is produced through an industrial process that requires quite large production runs to achieve economies of scale. Consequently, there are long lead times and relatively high inventory levels. Once produced, there is little flexibility to revise the form factor, by re-cutting and re-collating for instance. The color control of this physical merchandise is generally very good, including the control of metamerism which is managed by using pigment combinations that match as closely as possible the final product, in this case decorative paints. However, this type of merchandise cannot provide immediately available, customized or short run color merchandise. Onsite printing of color merchandise can meet this need. However, print technology has not yet been adequately accurate to meet the required quality standard. Specifically, the ability to produce non-metameric (or minimally metameric) color merchandise is not yet achievable.

Recently, paint viewing or paint selection software, such as Benjamin Moore® Paints' Personal Color Viewer™ ("PCV") available either on the World Wide Web or as CD-ROM, has improved the paint selection process for buyers. The PCV software displays on a computer screen a number of standard interior rooms with furniture, e.g., living room, dining room, bedrooms kitchen and bathroom, as well as the exteriors of a dwelling. The buyers can change the colors of the room, including ceiling, trim and upper and lower walls, at will to project the colors to the entire room. Additionally, digital images of the buyers' own dwellings can be manipulated by the PCV software to display the desired colors.

However, many conventional paint selection tools, e.g., paint chips and paint selection software, are subject to the effects of color inconstancy and metamerism. It is known that colors can look different under different viewing conditions. Thus, a consumer may observe that a particular color, or a pair of colors, has one appearance under one ambient light or illuminant but has a different appearance under a different ambient light or illuminant.

Color inconstancy is the change in color perception of a single physical color under different light sources. Light sources are often identified by two important parameters: color temperature (CT) and spectral power distribution. The CT of a light source is determined by comparing its chromaticity with that of an ideal blackbody radiator. When the given light source has the same CIE 1931 chromaticity co-ordinates as that of a blackbody radiator (Planckian radiator) at a certain temperature (in Kelvin units), this temperature is called the color temperature of the light source. For example, CIE Illuminant A has a CT of 2856K. On the other hand, the term correlated color temperature (CCT) is introduced when the chromaticity of a given light source is not exactly equal to any of the chromaticities of a black body radiator. The CCT is defined as the temperature of the blackbody radiator whose perceived color most closely resembles that of the given light source at the same brightness and under specified viewing conditions. For example, some fluorescent daylight lamps have a CCT of 6500K.

The spectral power distribution, SPD, is a measure of the amount of energy emitted by the light source at each wavelength in the visible spectrum. This information is usually reported at 1, 2, 5, 10 or 20 nanometer intervals. For example, a color observed outdoors is illuminated by the sun with a wide range of CCT and SPD from sunrise to sunset. Indoor illumination or artificial light is rarely as bright as natural sunlight and differs considerably in SPD and may also differ in CCT. Illumination is an important factor in viewing colors, and the brightness of the environment, as well as the CCT and SPD, have a measurable effect on colors perceived by people. This effect explains why a consumer sometimes thinks that a sample paint color, such as the color of a paint chip, appears different at home (e.g., under incandescent light) than the way that paint color had appeared at a retail store (e.g., under fluorescent light). Some colors shift more than others under different light sources; colors that shift to a greater degree are said to have a higher degree of inconstancy.

Another drawback of paint chips, paint selection software, and other conventional color selection tools is that they are subject to metamerism. Two or more colors may have the same color appearance under one ambient lighting condition, but may appear to be different colors under another ambient lighting condition. This is caused by the color pigment combinations of the paints being different from each other resulting in different spectral reflectance factors (SRF), which is a measure of the amount of energy reflected from a sample object at the wavelengths of visible light. Typically these are reported at 1, 2, 5, 10 or 20 nanometer intervals. As an example, consider a green paint chip side-by-side with an actual green paint applied on a wall. Since this paint chip is made with certain pigment combinations and the paint is made with different pigments, their chemical and pigment compositions are different and would reflect light differently. Hence, while both may appear the same color under one light source, they may appear as different colors or non-matching colors, or different shades of the same color, under a different light source. More particularly, in natural daylight, both the paint chip and painted wall appear to be the same shade of green. However, when viewed under incandescent light, while the paint on the wall may still appear green, the paint chip color could appear as a different shade of green. Accordingly, consumers appreciate the need for paint selection tools that exhibit minimal metamerism in reference to colors or paints.

The patent and scientific literatures disclose a number of attempts to address the problem of metamerism. U.S. Pat. No. 6,259,430 B1 discloses a method of displaying colors that allegedly can control the metameric effect. This method divides the radiation spectrum into at least four wavelength bands and selects a single representative wavelength in each band. The intensity of each representative wavelength is selected, and a plurality of radiation beams at the selected intensities and representative wavelengths are generated and combined to produce the desired color.

U.S. Pat. No. 7,053,910 B2 discloses a method for reducing metamerism in color management systems. This method applies multiple different inverse transforms to a color value in perceptual color space, one each for multiple different viewing conditions, thereby resulting in plural different target color values in a viewing condition dependent space. Subsequently, a single color value in destination device dependent color space is obtained through best-fit regression analysis (e.g., weighted regression analysis), thereby minimizing metameric shifts in color appearance due to changes in viewing conditions.

Inkjet printers use dye-based inks and pigment-based to print on papers. Dye-based inks can mix as they are being printed and are absorbed into the papers leaving very little ink on the surface of the papers. Dye-based inks can provide a large color gamut, but are susceptible to color fading. A number of inkjet manufacturers have produced pigment-based inks in order to address the color fading issue, and pigment-based inks are durable. Pigment-based inks comprise solid color pigments suspended in resin similar to architectural coatings and paints, and the solid color pigments, which can be organic and/or inorganic, are not absorbed into the papers, but are deposited on top of the papers and held to the papers by the resin.

However, there still remains a need in the art for an improved method of managing metamerism, especially of printed color merchandise, which can assist consumers in selecting paint colors.

SUMMARY OF THE INVENTION

The present invention concerns a method for managing metamerism for a set of color standards and color merchandise. Initially, one measures the spectral reflectance factor (SRF) of each color standard (this may be actual paint or a good representation thereof such as a carefully produced nitrocellulose lacquer) using a color measurement device such as a spectrophotometer. Subsequently, one selects a set of ink compositions corresponding to the spectral reflectance factor of each color standard. These ink compositions are then used with an inkjet printer to produce a set of color merchandise (e.g., paint chips) using non-fluorescent inks on a media free of optical brighteners.

Next, one measures the spectral reflectance factor of the color merchandise. Subsequently, one evaluates the degree of metamerism for the set of color standards and color merchandise pairs by means of either, or preferably both, an instrumental test having a first acceptance criterion and/or a visual test having a second acceptance criterion. If a given color standard-color merchandise pair has an unacceptable degree of metamerism, the ink composition used to produce the color merchandise is re-selected until an acceptable degree of metamerism is achieved or until one reaches the conclusion that an improved match is not possible with the materials available either due to gamut limitations or colorimetric properties. After evaluating the degree of metamerism for each color standard-color merchandise pair, one ascertains $p_{ins}$ and/or $p_{vis}$, wherein $p_{ins}$ represents the percentage of color standard-color merchandise pairs that pass the instrumental test and $p_{vis}$ represents the percentage of color standard-color merchandise pairs that pass the visual test. If the value of $p_{ins}$ and/or $p_{vis}$ is below an optimal value or if $p_{ins}$ and $p_{vis}$ do not correlate well, then one modifies the first acceptance criterion, the second acceptance criterion, or both criteria until a balance is achieved between the acceptance criteria values and $p_{ins}$ and $p_{vis}$.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION

Figure 1:
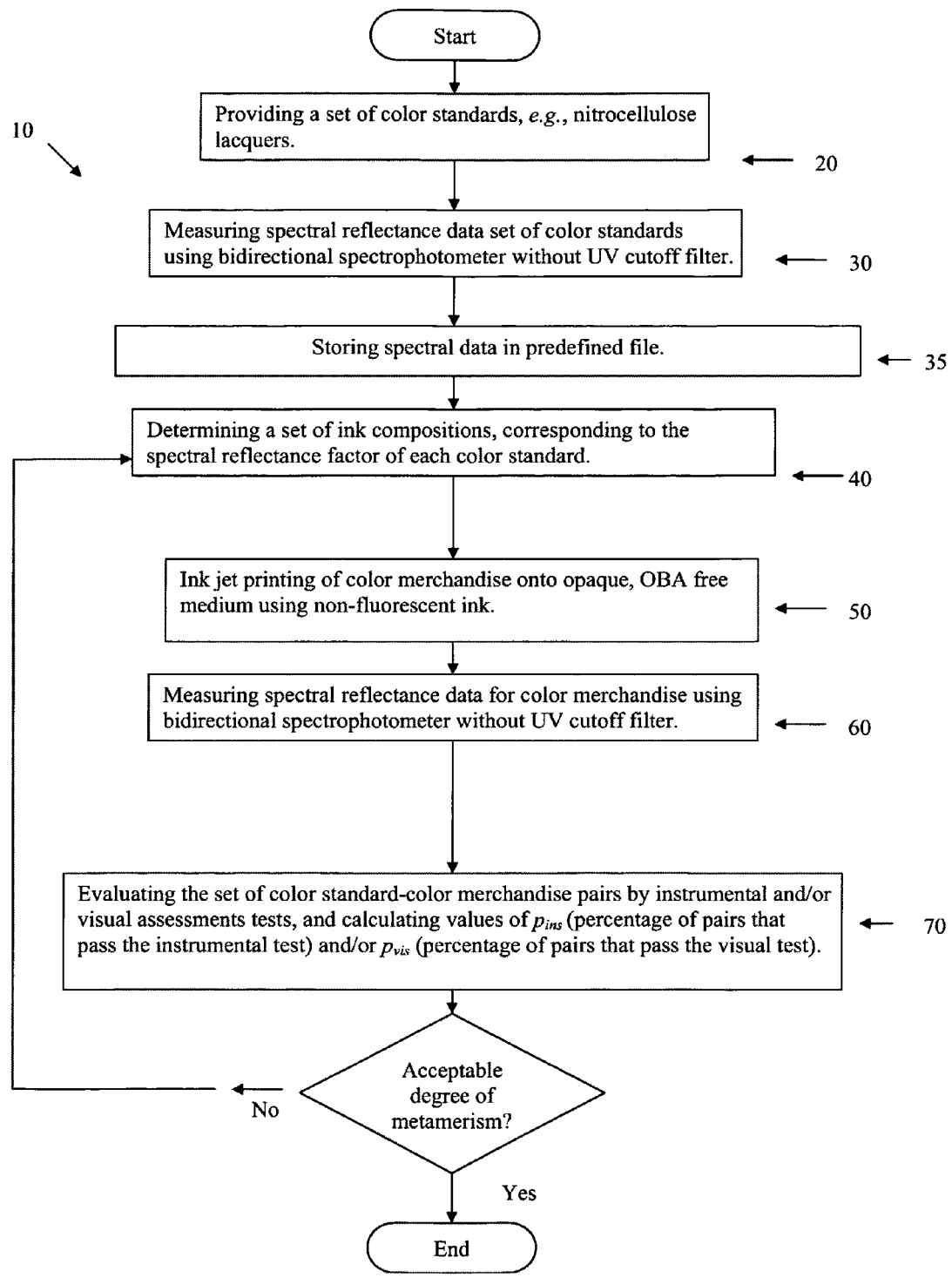
FIG. 1 is a flowchart representation of a preferred method of the present invention.

The present invention relates to a method for minimizing the effects of metamerism between a set of color standards (e.g., nitrocellulose lacquers or paints) and inkjet printed color-merchandise (e.g., paint chips) under a plurality of illuminants or corresponding light sources. An inkjet printer produces a particular color merchandise from a non-fluorescent ink combination that is deposited onto an opaque substrate free of optical brighteners. The inks can be dye-based inks or pigment-based inks. The ink combination is determined by identifying the best combination of inks after evaluating a very large number of the total possible ink combinations. The best combination is the one with the best spectral match to the color standard. Innovatively, instrumental and/or visual assessments are used to evaluate color difference between a set of color standards and color merchandise under a plurality of illuminants and corresponding light sources. If a given color standard-color merchandise pair fails either or both test(s) then the selected ink combination is adjusted until an acceptable degree of metamerism is achieved, or until one reaches the conclusion that an improved match is not possible with the materials available either due to gamut limitations or colorimetric properties. The percentage of color standard-color merchandise pairs with an acceptable degree of color difference should preferably be above an optimal threshold quantity for the instrumental and/or visual tests, and both tests should yield substantially similar percentage values. Otherwise, one modifies the acceptance criteria for the instrumental and/or visual tests.

Metamerism is defined herein as "the property of two specimens that match under a specified illuminator and to a specified observer and whose spectral reflectances or transmittances differ in the visible wavelengths . . . . As a consequence of the required difference, the two specimens may not match under a different illuminator or to a different observer." ASTM Standard E 284, "Standard Terminology of Appearance," (ASTM International, West Conshohocken, Pa.), which is incorporated herein by reference in its entirety. Metamerism differs from the phenomenon of color inconstancy, which refers to a single color's change of appearance under different lighting conditions.

As used herein, the term "illuminant" refers to mathematical profiles having defined correlated color temperatures ("CCT") or color temperature ("CT") and spectral power distributions (SPD). The term "light sources" refers to physical simulators of illuminants, which substantially match the theoretical profiles of said illuminants.

As used herein, a color standard is any object designated as representing the precise color intended, whereas color merchandise is any object that embodies a satisfactory but not exact representation of the color intended. A paint chip or color chip is an example of color merchandise produced by traditional means or inkjet printing that satisfactorily represents the intended color. The term "satisfactory representation" refers to a paint chip that is deemed to "match" the color standard visually, instrumentally, or both according to established criteria including metamerism, such as the criteria stated herein.

FIG. 1 is a flowchart schematically depicting inventive method 10 for reducing the effects of metamerism between a set of color standards and color merchandise under a plurality of illuminants. In step 20, a set of color standards is provided. In one aspect of the present invention, the color standards are pigmented coating compositions such as nitrocellulose lacquers, aqueous paints, alkyd paints or the like. For instance, the color standards can be nitrocellulose lacquers representing commercially available paint colors from a color system or collection, e.g., Benjamin Moore's color system. Accordingly, one can generate a library of commercially available paint colors that consumers or retailers may use to produce on-demand color merchandise (e.g., paint chips of various dimensions), which could be used as paint selection tools. The production of such a color library is facilitated by capturing and storing spectral and colorimetric data for each color standard.

Figure 2:
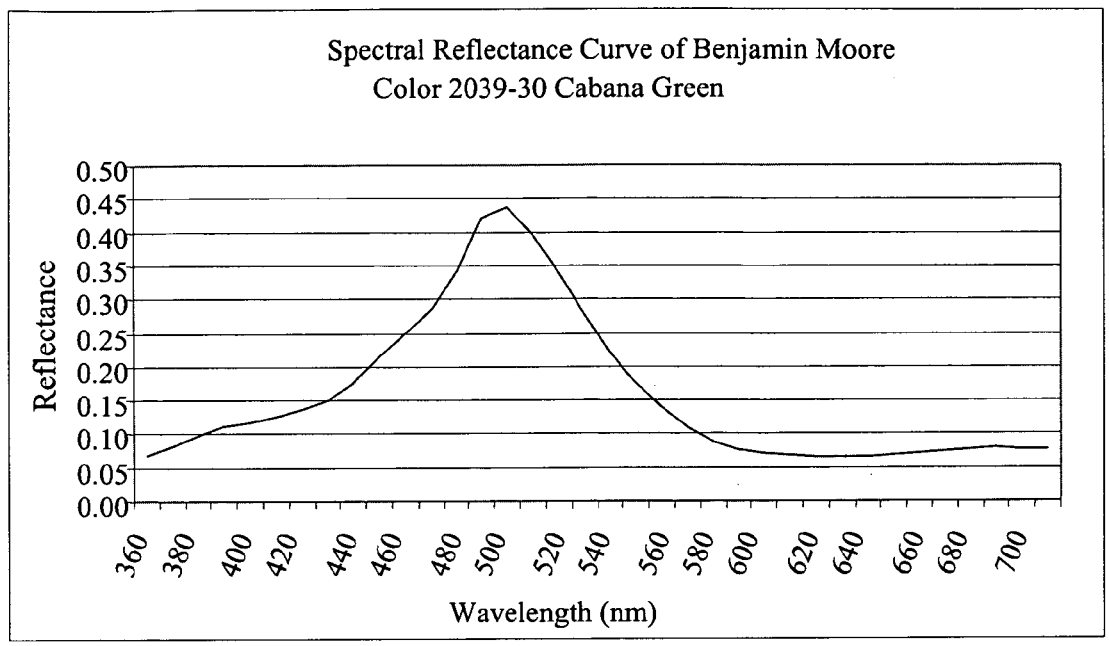
FIG. 2 is a spectral reflectance factor graph of a commercially available paint color.

In step 30, a suitable color measurement device, such as a spectrophotometer or a colorimeter, is used to measure the spectral reflectance factor of each color standard. Spectral reflectance factor data quantifies the amount of light that is reflected from an object at intervals along the electromagnetic spectrum. By way of example, FIG. 2 is a graph plotting the spectral reflectance factor data of Benjamin Moore Color 2039-30 Cabana Green. Preferably, the color measurement device, as used in the present invention, is a spectrophotometer without an ultraviolet cutoff filter. The advantage of using a spectrophotometer without an ultraviolet cutoff filter is that it will reveal the use of a fluorescing pigment or paper with optical brighteners. Such materials are undesirable because they will yield a different color when ultraviolet light is present than when it is not. Consequently, the spectrophotometer without an ultraviolet cutoff filter contributes to a more useful measurement of a color standard's spectral reflectance factor. An example of a suitable spectrophotometer is the X-Rite® i/1 without a UV-cutoff filter (commercially available from X-Rite Incorporated of Grand Rapids, Mich.).

Advantageously, the spectrophotometer or other such device, which measures spectral reflectance factor data can also calculate colorimetric data based on a color space system. It is capable of communicating with a computer, a controller or central processing unit (collectively "CPU"). Thus, in step 35, the spectral and/or colorimetric data for each color standard is stored in a predefined file within the CPU memory. Alternatively, the spectral and/or colorimetric data may be stored in external memory devices such as memory cartridges, CD-ROMs, and the like. As discussed further below, the CPU, by means of standard algorithms is also used to compare the spectral quality of the color standard to the color sample under a plurality of light sources. The results may be reported as pass or fail based on certain acceptance criteria.

In step 40, for each color standard, one determines, using any suitable means, including proprietary means, an ink combination that yields color merchandise having a high degree of color-matching accuracy. Generally, such accuracy is achieved by (1) maintaining a color match, i.e., determining the least metameric match, across various illuminants or light sources and (2) correcting for mismatch between the colorants used in the manufacture of standards and those used in a printing system. While the mismatch of pigments may be addressed through ink reformulation or adding inks to the printing system, determining the least metameric match may be addressed by several possible methods, including those depicted in FIG. 3. Other possible methods are discussed in the following publications, which are incorporated herein by reference in their entireties: D. R. Wyble and R. S. Berns, "A Critical Review of Spectral Models Applied to Binary Color Printing," *Color Res. Appl.* 25: pp. 4-19, February 2000; L. A. Taplin and R. S. Berns, "Spectral Color Reproduction Based on a Six-Color Inkjet Output System," *IS&T/SID Ninth Color Imaging Conference*, pp. 209-213 (2001); and U.S. Pat. No. 6,698,860 to Berns et al.

Figure 3:
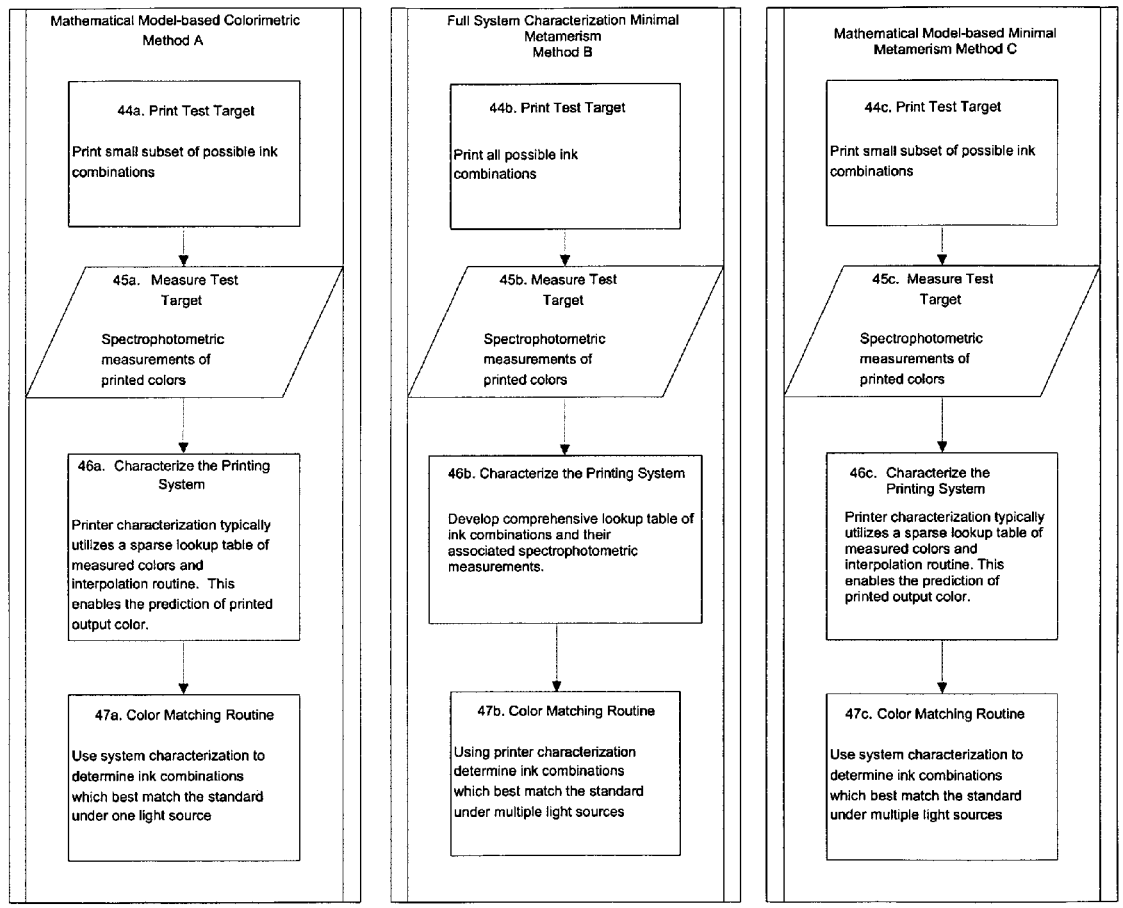
FIG. 3 is a flowchart depicting different methods for determining a suitable ink combination that could be used to produce color merchandise.

Generally, as illustrated in FIG. 3, step 40, i.e., the step of determining an ink combination for the production of merchandise with a high degree of color-matching accuracy, involves (i) printing color patches; (ii) taking spectrophotometric measurements of the color patches; and (iii) utilizing a math engine (interpolation routine) for color matching. Experience indicates that the use of a larger number of color patches would yield higher color-matching accuracy. Theoretically, the highest color-matching accuracy would require a full system characterization thus avoiding the need for an interpolation routine. A full system characterization would require printing and spectrally measuring every ink possible combination.

FIG. 3 depicts flowcharts of Methods A, B, and C. Method A is a partial system characterization method that involves taking spectrophotometric measurements of a limited number of color patches and determining the ink combinations that best match the color standard under one light source. Method B is a full system characterization method that involves taking spectrophotometric measurements of all possible color patches and determining the ink combinations that best match the color standard under multiple light sources. Method C is a partial system characterization method that involves that involves taking spectrophotometric measurements of a limited number of color patches and determining the ink combinations that best match the color standard under multiple light sources.

The full system characterization method, depicted as Method B in FIG. 3, requires at least four substeps. First, in step 44b, one prints a test target for all possible ink combinations. The total number of color patches, which are required for full system characterization of various 8-bit printing systems that use a 256 color palette, can be tabulated as follows:

TABLE 1

| Printer Type | System Description | Total Number of Color Patches for Full System Characterization (8-bit system) | Number of Printed Pages (3000 patches/page) |
|---|---|---|---|
| RGB | Conventional desktop | $256^3$: 16,777,216 | 5,593 |
| CMYK | Digital proofer | $256^4$: 4,294,967,296 | 1,431,656 |
| CMYK + C1, C2 | Hexachrome, professional photography | $256^6$: 281,474,976,710,656 | 93,824,992,237 |

Second, in step 45b, after printing the test targets, one takes spectrophotometric measurements of all the printed color patches. Third, in step 46b, the spectral data are used to develop a comprehensive lookup table of ink combinations and their associated spectrophotometric measurements. Fourth, in step 47b, the lookup table is used to determine the ink combinations that best match the various color standards under multiple light sources, i.e., one determines the least metameric match. The information within color look-up tables is processed by printer drivers or other color management modules or software programs having computer executable process steps.

Key challenges associated with this full system characterization method are the large number of color patches to be measured (and their associated printed consumables) and the data processing for the large data set. Conventionally, these challenges could be addressed by reducing the number of patches printed and implementing an interpolation algorithm, as illustrated by Methods A and C in FIG. 3. More particularly, in both Methods A and C, a small subset of possible ink combinations (e.g., as few as four (4) colors for a CMYK printer) may be used to produce test targets in steps 44a and 44c, respectively. Next, one may take spectrophotometric measurements of the printed color patches in steps 45a and 45c. Subsequently, in steps 46a and 46c, the spectral data may be used to develop a sparse lookup table and an interpolation routine. For Method A, in step 47a, the lookup table and interpolation routine are used to determine the ink combinations that best match the various color standards under a single light source. For Method C, in step 47c, the lookup table and interpolation routine are used to determine the ink combinations that best match the various color standards under multiple light sources. Thus, Methods A and C are similar mathematical model-based processes, except that Method A is a colorimetric method that should be used when it is not necessary to minimize metamerism, whereas Method C is a method that should be used when it is necessary to minimize metamerism.

Additionally, in lieu of spectrophotometric measurements, a suitable photography system could be implemented in steps 45a, 45b or 45c to further streamline the color matching process. Although Methods A and C, as well as the photography system, could streamline the full characterization process, each deviation stresses the other components in the system. Thus, for example, reducing the number of color patches puts more weight on the integrity of spectral measurements and the interpolation routine. A potential method for optimizing step 40 could begin with gradually increasing a minimal number of color patches until a point of diminishing return is reached. While this method would utilize a smaller number of color patches and an interpolation routine, the point of diminishing return would be determined empirically, based on process capability and standard process variation.

Tables 2 and 3 below illustrate how Methods A-C, discussed above, can be used to determine ink compositions that spectrally match color standards for Benjamin Moore colors 2132-50 and 2110-60, respectively. In each case, the optimal CMYK ink densities as well as the CIEDE2000 color differences are specific to the method utilized and the colorimetric conditions used for evaluation. Although colorimetric conditions for only two illuminants are noted, one could use three, four, five, or more illuminants.

TABLE 2

Ink densities and color differences for Benjamin Moore color 2132-50

| | Standard for Benjamin Moore Color 2132-50 | Printing Method (A) Mathematical model-based method (colorimetric, D65/10) | Printing Method (B) Full system characterization method (minimal metamerism) | Printing Method (C) Mathematical model-based method (minimal metamerism) |
|---|---|---|---|---|
| C | — | 11.4% | 7.5% | 7.5% |
| M | — | 12.8% | 9.4% | 9.3% |
| Y | — | 8.2% | 6.6% | 6.9% |
| K | — | 0.0% | 100.0% | 92.9% |
| Colorimetry (D65 illuminant/10° observer) | | | | |
| CIEDE2000 | — | 0.00 | 0.34 | 0.61 |
| Colorimetry (TL84 illuminant/10° observer) | | | | |
| CIEDE2000 | — | 2.96 | 0.41 | 0.97 |

TABLE 3

Ink densities and color differences for Benjamin Moore color 2110-60

| | Standard for Benjamin Color 2110-60 | Printing Method (A) Mathematical model-based method (colorimetric, D65/10) | Printing Method (B) Full system characterization method (minimal metamerism) | Printing Method (C) Mathematical model-based method (minimal metamerism) |
|---|---|---|---|---|
| C | — | 10.0% | 9.9% | 9.9% |
| M | — | 4.0% | 3.5% | 4.0% |
| Y | — | 1.1% | 1.2% | 1.2% |
| K | — | 0.0% | 2.9% | 1.4% |
| Colorimetry (D65 illuminant/10° observer) | | | | |
| CIEDE2000 | — | 0.00 | 0.50 | 0.23 |
| Colorimetry (TL84 illuminant/10° observer) | | | | |
| CIEDE2000 | — | 1.02 | 0.48 | 1.04 |

Figure 4:
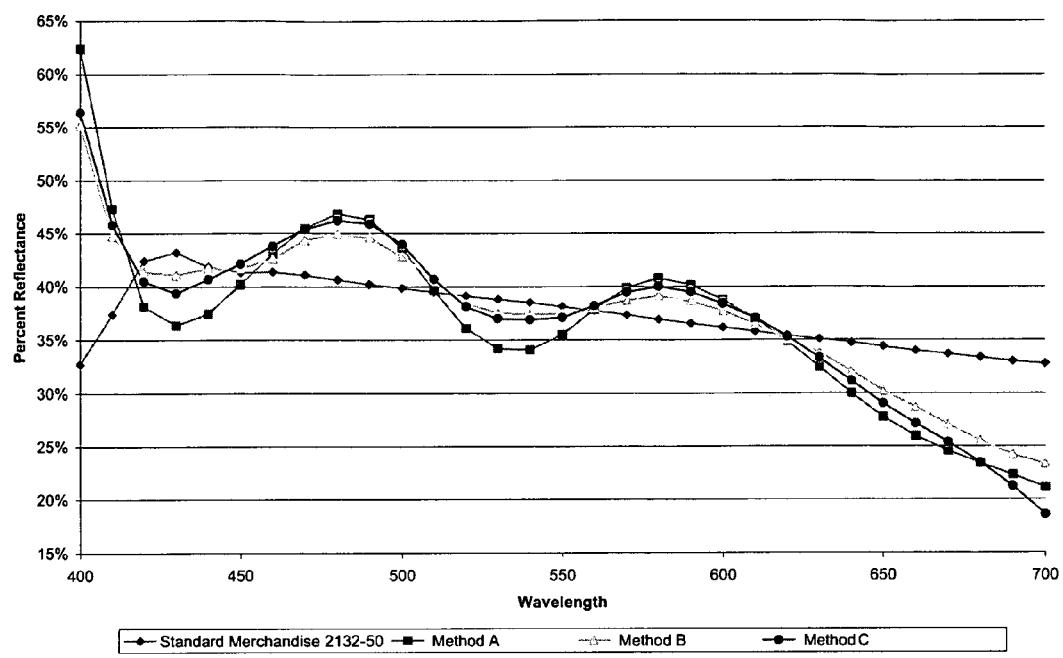
FIG. 4 is a spectral reflectance curve of a color standard along with spectral reflectance curves of optimal color matches produced using the methods depicted in FIG. 3.
Figure 5:
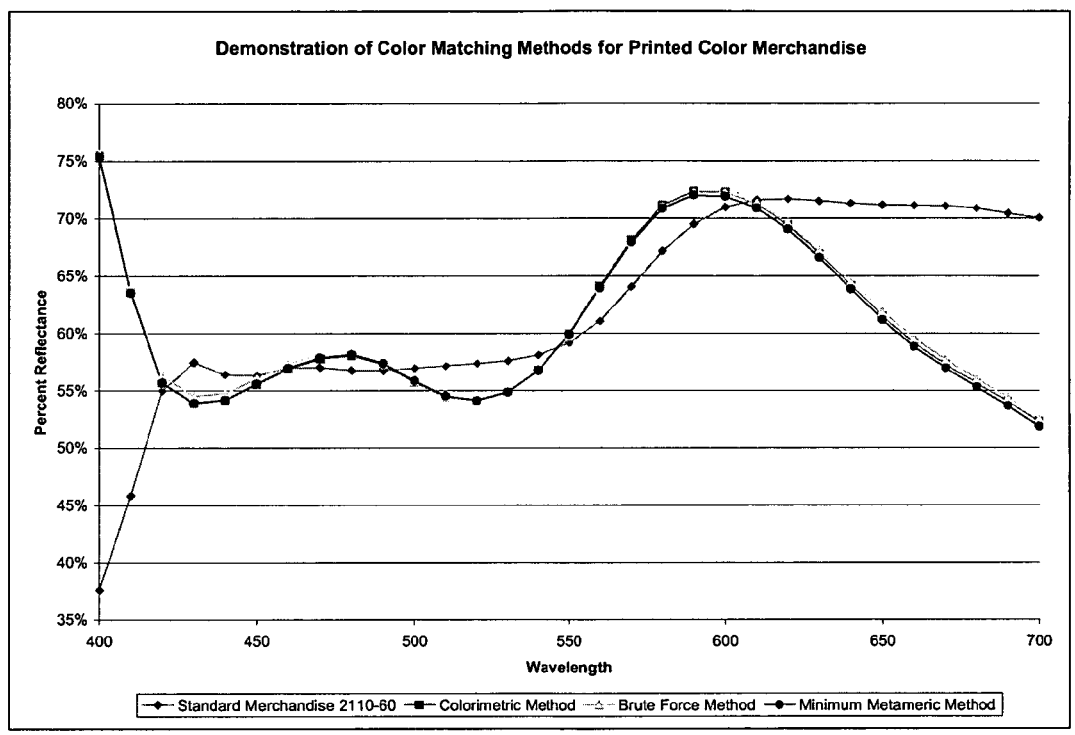
FIG. 5 is a spectral reflectance curve of another color standard along with spectral reflectance curves of optimal color matches produced using the methods depicted in FIG. 3.

FIGS. 4 and 5 illustrate the spectral reflectance curves of Benjamin Moore colors 2132-50 and 2110-60, respectively, along with optimal matches for the specified printing Methods A-C.

Heretofore, conventional color lookup tables have not taken into account the relative importance of different viewing conditions. For example, a CMYK color may match its corresponding color standard under fluorescent illumination (common in office environments) but it may be more important for the two colors to match under incandescent illumination (common in home environments). More recently, color scientists have developed methodologies that weigh the relative importance of different viewing conditions so as to represent more accurately the probability that any one viewing condition occurs. See U.S. Pat. No. 7,053,910 B2 to Newman, which is incorporated herein by reference in its entirety. Newman discloses a method that can be used to create a reasonable match under the most common viewing or ambient conditions and reducing metamerism as much as possible for other less important sources. Similarly, US Patent Application Publication No. US 2005/0094169 A1 to Berns et al, which is also incorporated herein by reference in its entirety, discloses a methodology that takes into account different viewing conditions.

In the present invention, the ink combination corresponding to each color standard should yield a minimal degree of metamerism under at least three, preferably at least four, and more preferably at least five illuminants. The primary illuminant, i.e., the most important illuminant for purposes of metameric matching, should have at least about 1.5 times, preferably at least about 1.75 times, more preferably at least about 2.0 times more weight than any other illuminant. In an alternative embodiment, each illuminant has an equal weight. The relative weights of the illuminants can be used in different methodologies including, but not limited, to a means that involves determining ink combinations based on the weighted average color difference.

Preferably, in an innovative aspect of the present invention, the primary illuminant is a novel balanced illuminant with CCT in the range of about 4200 K to about 4600 K and more preferably about 4300 K to about 4500 K, which emulates a balance of lighting conditions between cool (6500 K) and warm (2856 K) color temperatures (herein "Balanced Illuminant"). Such balance is achieved by a using a spectral power distribution that mixes, in the proper ratio, the standard CIE Illuminants D65 and A. The inventive use of the Balanced Illuminant as the primary illuminant reflects the novel methodology of including a weighted aggregate light source that viewers of colors or buyers of paints and paint merchandise may encounter in the real world.

Standard illuminants with a defined spectral power distribution have been recommended by the CIE and adopted by many industries. For instance, the CIE D illuminants (D50, D55, D65 and D75) represent different phases of "average" daylight, with respective correlated color temperatures of 5000, 5500, 6504 and 7500 K. The illuminant D65, representing average noon daylight, is a commonly-used standard illuminant and can be used in the present invention to assess color difference values. Other suitable illuminants include, without limitation, CIE Illuminant A, CIE Illuminant CWF ("Cool White Fluorescent")/F2, and CIE illuminant F11. CIE Illuminant A (CCT 2856 K) represents incandescent light sources such as household tungsten filament lamps. CIE Illuminant CWF/F2 (CCT 4100 K) represents cool white fluorescent light sources. CIE Illuminant F11 (CCT 4000 K) represents TL84, narrow band tri-phosphorous fluorescent light sources.

In a preferred aspect of the present invention, the optimal ink combination for each color standard is determined for four illuminants: Balanced Illuminant (with relative weight of about 2) and CIE Illuminants D65, CWF/F2 and A (with relative weights of about 1). Optionally, a fifth illuminant, F11 (with a relative weight of about 1) can also be used.

The ink combination, determined under step 40, is used in any suitable ink jet printer such as, preferably, the Epson® Stylus Pro 7900 or 9900 (commercially available from Epson America, Inc., Long Beach, Calif.), the Hewlett-Packard Photosmart® Pro B9180 or Designjet® Z-2100 and Z-310 (commercially available from Hewlett-Packard Company of Palo Alto, Calif.), or the Canon imagePROGRAF® IPF5000 (commercially available from Canon U.S.A., Inc. of Lake Success, N.Y.). Before using the ink jet printer to print color merchandise, it is necessary to warm-up and calibrate the printer.

Figure 6:
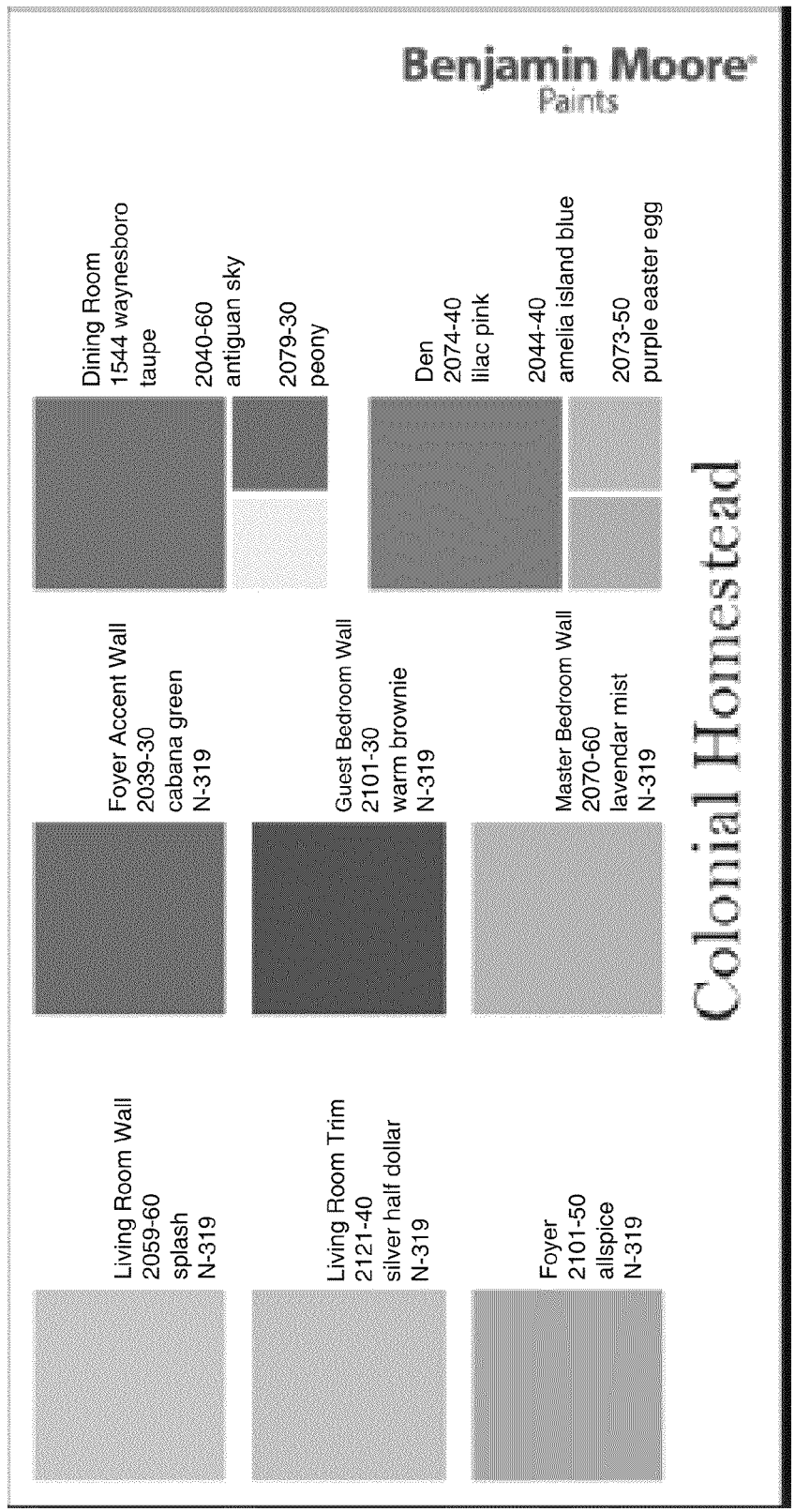
FIG. 6 illustrates color merchandise produced in accordance with the present invention.

Subsequently, in step 50, in an innovative aspect of the present invention, non-fluorescing media is used to produce color merchandise including, but not limited, to paint chips and color charts of various dimensions (e.g., 1.25"×2", 3"×5", 8.5"×11", 17"×22", 18"×18" sized paint chips). FIG. 6 illustrates color merchandise in the form of a panel of nine (9) paint chips. Other suitable color merchandise and methodology(ies) for displaying colors may found in the commonly owned, co-pending patent application, entitled "Apparatus and Method for Dispensing Color Merchandise" Ser. No. 12/380,745, which is filed on even date herewith, and which is incorporated herein by reference in its entirety including any model, exhibits, or specimens contained therein.

More particularly, in step 50, the ink jet printer produces color merchandise by depositing a non-fluorescent ink combination, according to the amount determined in step 40, onto a substrate that is free of optical brighteners ("OBA") or fluorescent whitening agents ("FWA"). OBA/FWA fluoresce in the presence of ultraviolet illumination, and would disadvantageously produce a greater color difference between the color standard and color merchandise when ultraviolet light is present. In addition, the poor fading property of FWA also produces a greater color difference between the color standard and the color merchandise. The deleterious effect of fluorescence is explained in "The Effects of Fluorescence in the Characterization of Imaging Media" CIE Publication 163 (2004), which is incorporated herein by reference in its entirety. It has been found that one suitable OBA/FWA free substrate for this invention is EPSON® UltraSmooth Fine Art Paper. Similarly, it has been found that one suitable non-fluorescing ink for this invention is the EPSON® UltraChrome K3 Ink. Both the substrate and ink are commercially available from Epson America, Inc. of Long Beach, Calif. Other suitable OBA/FWA free substrate include fine art paper commercially available from InkPress Paper of Monsey, N.Y. and from Hawk Mountain Papers of Leesport, Pa. Other suitable non-fluorescing ink include Hexachrome®, a CMYK+OG ink (commercially available from Pantone, Inc. of Carlstadt, N.J.), AbsoluteProof ExtraChrome® (commercially available from Gimlé Ltd. of Christchurch, New Zealand), and a CMY+RGB ink that is commercially available from Opaltone, Inc. of Charlotte, N.C.

In step 60, the spectral reflectance factor for each color merchandise sample is measured after it has dried for about 30 (thirty) to sixty (60) minutes or more under ambient conditions. Although both the substrate and ink are non-fluorescing media, there exists the possibility through error or misfortune that either or both media still contain some amount of residual fluorescence that would be visible under ultraviolet illumination. Thus, in order to identify such residual fluorescence, it is necessary to use a color instrument, such as a spectrophotometer, without an ultraviolet cutoff filter as in step 30. As explained above, the color instrument not only measures the spectral data of color merchandise, but it also mathematically maps that spectral data onto any one of several color space systems such as, preferably, the well-known three-dimensional CIELAB color space.

In step 70, instrumental and/or visual tests are used to evaluate the acceptability of color match between a set of plural color standards and inkjet printed color merchandise under a plurality of illuminants. Instrumental tests utilize a CPU, color measurement device or like computational instrument to calculate the value of one or more mathematical expressions suitable for evaluating the degree of color difference and metamerism. Visual tests utilize a panel of observers (e.g., three or more observers) to ascertain the effects of metamerism. Either the instrumental or visual tests can be singly used to assess the acceptability of a color match. Advantageously, however, the combination of both the instrumental and visual means provide a greater degree of confidence that assessment of metamerism is accurate and that an acceptable level of tolerance has been established. The number ($n_{total}$) of total color standard and color merchandise pairs, which are evaluated by both instrumental and visual means, can be in an order of magnitude equivalent to about $10^1$, preferably about $10^2$, more preferably about $10^3$, e.g., about 30, or about 300, or about 3000 color standard-color merchandise pairs. The illuminants should be the same plural illuminants used above in step 40, i.e., Balanced Illuminant, CIE Illuminants D65, CWF/F2 and A, and optionally F11.

If, in step 70, any one color standard-color merchandise pair has an unacceptable degree of metamerism, as evaluated under either the instrumental or visual test, one returns to step 40 in order to ascertain again an appropriate ink combination for that pair. One repeats this iterative process until an acceptable degree of metamerism is achieved or until it is determined that no optimal solution exists. In one aspect of the present invention, a consumer is informed of each color standard-color merchandise pair that does not pass either or both of the instrumental or visual tests. In another aspect of the present invention, if there is a first color merchandise product that does not have an acceptable degree of metamerism relative to its color standard, under either test, then one can use mathematical interpolation techniques to determine the optimal ink combination. More particularly, one can utilize two or more other color merchandise products that appear relatively similar to the first color merchandise product and determine their spectral reflectance factors. Subsequently, one can interpolate the spectral reflectance factor of the first color merchandise.

Instrumental means utilize one or more mathematical expressions including those described in a paper by F. H. Imai, M. R. Rosen, and R. S. Berns, entitled "Comparative Study of Metrics for Spectral Match Quality," *Proc. CGIV 2002: The First European Conference on Colour in Graphics, Image and Vision*, 492-496 (2002). This paper is incorporated herein by reference in its entirety. The Imai et al paper discloses that CIE color difference equations, spectral curve difference equations (e.g., root mean square equations), metamerism indices, and weighted root mean square equations are all suitable for evaluating the degree of metamerism.

In a preferred aspect of the present invention, instrumental means utilize CIE color difference equations to ascertain the effects of metamerism. Color difference ($\Delta E$) is defined as the distance between two colors in a color space such as CIELAB (also commonly referred to as L*a*b* or Lab) perceptual color space system developed in 1976 by the Commission Internationale de' L'Eclairage ("CIE") or International Committee on Illumination. The three dimensions are lightness (L), redness/greenness (a) and yellowness/blueness (b). As explained in greater detail below, these three CIELAB coordinates are based on CIE XYZ tristimulus values, which quantify the broad spectral sensitivities of the three human cone cells (i.e., the L, M, S cones named for their respective spectral sensitivities to long, medium, and short wavelengths of light). It should be noted that the biological basis of metamerism lies in the fact that different objects can trigger the same neural response from the set of three human cones, leading to equivalent tristimulus values.

Figure 7:
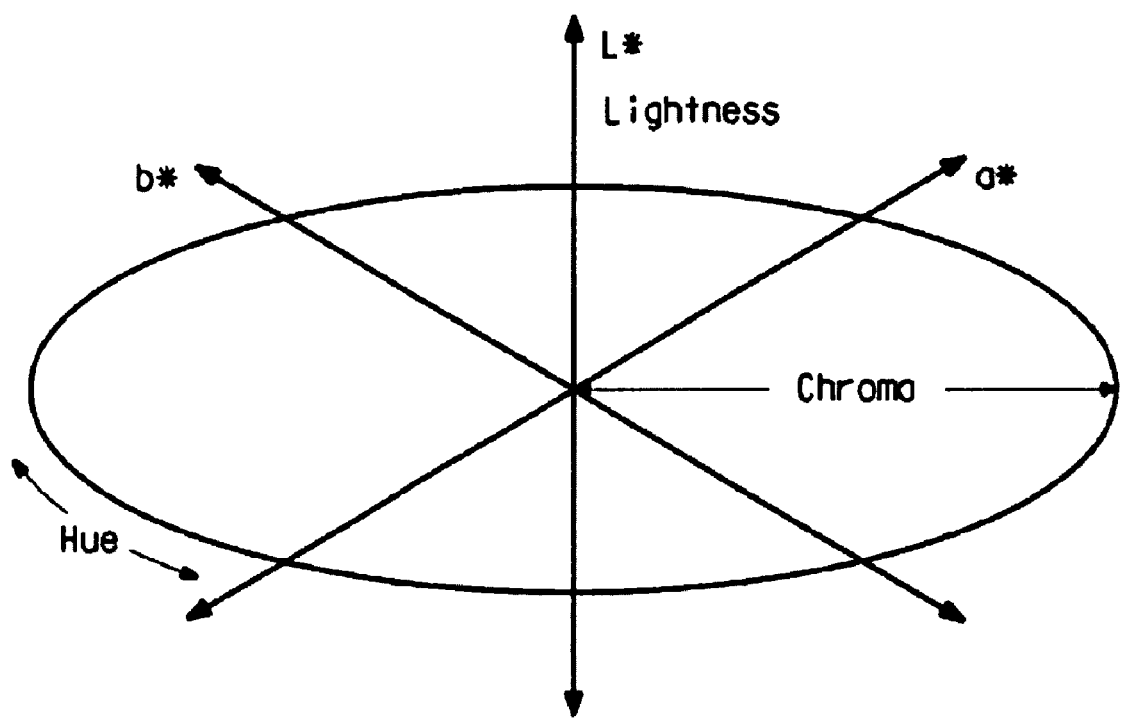
FIG. 7 is a schematic illustration of the CIE L*a*b* three-dimensional color space.

Referring to FIG. 7, the axis labeled L* in the figure represents a scale of luminous intensity or degree of lightness attribute. The axis labeled a* represents a scale of red/green appearance and the orthogonal axis b* represents a scale of yellow/blue appearance. The information contained in the combination of a color's a*-b* axes position represents the chromatic attributes known as hue and saturation. The hue varies with the position about the L* axis and the chroma changes with the distance from the L* axis. Therefore, a complete set or group of color attributes, or the attributes' defining coordinates comprising lightness (L*), red/green (a*), and yellow/blue (b*) in the L*a*b* color space, fully defines a color point or locus in the color space. When generally used herein, the term colorimetric data shall be understood to mean one or more complete sets or groups of color attributes or corresponding coordinates considering all three dimensions or axes in a three dimensional color space.

The CIELAB color space coordinates are derived from tristimulus values in the "master" CIE XYZ color space, which was originally developed in 1931 for a hypothetical "standard" observer who views color through a 2° field of view. The defining equations for tristimulus values are:

$$X=\int \bar{x}(\lambda)S_n(\lambda)R(\lambda)d(\lambda) \quad (1)$$

$$Y=\int \bar{y}(\lambda)S_n(\lambda)R(\lambda)d(\lambda) \quad (2)$$

$$Z=\int \bar{z}(\lambda)S_n(\lambda)R(\lambda)d(\lambda) \quad (3)$$

Here, $S_n(\lambda)$ is used to indicate the relative radiance at a given wavelength $\lambda$ from a known illuminant (or light source) n. For example, the spectral power distribution from CIE Illuminant A, a tungsten bulb, would be indicated as $S_A(\lambda)$. Other illuminants, which are discussed in greater detail below, as ambient or background light can also be used to calculate CIE XYZ tristimulus values, thereby facilitating the calculation of color difference and other colorimetric data for different viewing, ambient or background conditions. $R(\lambda)$ is used to indicate the spectral reflectance factor ("SRF") for a given object (e.g., a color standard) at a given wavelength. And $\bar{x}(\lambda)$, $\bar{y}(\lambda)$, $\bar{z}(\lambda)$ indicate the CIE color matching functions, which measure the spectral sensitivity of a standard observer at a particular viewing angle. In addition to the 1931 2° standard observer viewing angle, the CIE published matching functions for a broader 10° standard observer viewing angle in 1964.

After calculating X, Y, Z tristimulus values for a given color standard, one can calculate CIELAB color space coordinates using the following equations:

$$L^*=116(Y/Y_0)^{1/3}-16 \quad (4)$$

$$a^*=500[(X/X_0)^{1/3}-(Y/Y_0)^{1/3}] \quad (5)$$

$$b^*=200[(Y/Y_0)^{1/3}-(Z/Z_0)^{1/3}] \quad (6)$$

where $X_0, Y_0, Z_0$ are the tristimulus values of the perfect white for a given illuminant. The perfect white is the chromaticity of a white object under a given illuminant. In addition to the CIELAB color space, a person of ordinary skill in the art will readily appreciate that there are several other suitable color space systems. As discussed above, the CIE XYZ color space is one such system. It can be depicted by the CIE 1931 Chromaticity Diagram (based on two degree CIE Standard Observers) or the CIE 1964 Chromaticity Diagram (based on ten degree CIE Standard Observers). Other CIE color space systems include CIELUV (1976) and its cylindrical counterpart CIE L*C*h. All these CIE recommendations can be used with the present invention. Other color order systems or color specifiers such as Pantone, Natural Color System, Munsell Color System, Hunter LAB system or the like, can also be used with the present invention. Some of these systems can be converted to the CIE diagram, e.g., the Munsell systems are convertible to CIE.

The value of $\Delta E$ is calculated using a color difference formula, such as, preferably the CIEDE2000 color difference formula for a 10° standard observer. The CIEDE2000 color difference formula is set forth in G. Sharma, W. Wu, and E. Dalal, "The CIEDE2000 Color-Difference Formula: Implementation Notes, Supplementary Test Data, and Mathematical Observations," *Color Res. Appl.* 30: pp. 21-30, February 2005, which is incorporated herein by reference in its entirety. As noted in the Sharma paper, CIEDE2000 color difference values are calculated by a methodology that transforms measured CIELAB values into CIE L*C*h (lightness, chroma, hue) color space values. The CIEDE2000 color difference equation comprises weighting factors $k_L$, $k_C$, and $k_H$ for the metric lightness difference, metric chroma difference and the metric hue difference, which in the present invention are 1, 1, 1, respectively. Other suitable color difference equations include the CIELUV, CIELAB and the CIE94 color difference equations.

Because CIE color difference equations rely on color space values, which are a function of illuminant spectra distribution (see the discussion of CIE XYZ above), one can calculate $\Delta E$ for the same plural illuminants used in step 40 above, i.e., at least three, preferably at least four, more preferably at least five illuminants. By evaluating the color standard and color merchandise under a broad spectrum of lighting conditions, one can take steps to minimize the effects of metamerism, i.e., the possibility that color standard and color merchandise will appear different under different light conditions.

For each color standard-color merchandise pair, one should tabulate a matrix of color difference values under the various illuminants, and note therein the minimum, maximum, and average $\Delta E$. For a given color standard and a given color merchandise, the average $\Delta E$ (CIEDE2000) value, for a 10° observer, should be less than about 1.0, preferably less than about 0.7, and more preferably less than about 0.4. Similarly, the maximum CIEDE2000 value, for a 10° observer, should be less than about 1.5, preferably less than about 1.4, and more preferably less than about 1.0.

Visual means can also be used to assess the color difference for the total number ($n_{total}$) of color standard-color merchandise pairs under at least three, more preferably at least four, and most preferably at least five illuminant simulators. The visual assessment may be conducted in any suitably controlled manner. In one exemplary manner, color standards are comprised on a set of mid-grey card masks (e.g., 17"×22") that are layered over color merchandise prints. The masks have semi-circular holes in the card that allow equal areas of color standard and color merchandise to be visible. The layered sets of masks and prints should be observed under light sources that emulate illuminants such as Balanced Illuminant, CIE Illuminant D65, CIE Illuminant A, CIE Illuminant CWF/F2, and optionally F11. Such simulators are commercially available as light booths, e.g., the Benjamin Moore Retail Lighting System, commercially available from Benjamin Moore & Co. of Montvale, N.J.; or the GLE-M® color matching luminarie series, commercially available from GTI Graphic Technology, Inc. of Newburgh, N.Y.; or the Judge II-S® viewing booth from X-Rite, Inc. of Grand Rapids, Mich. The layered sets of masks and prints are observed by a panel comprising individuals, who have normal color vision and are trained in color discrimination. The panel comprises three, preferably five, more preferably seven individuals.

Panelists may make perceptibility and/or acceptability judgments. Perceptibility judgments simply require a panelist to determine whether or not there is any visual color difference between the standard and merchandise, whereas acceptability judgments require panelists to determine whether the visual color difference is acceptable. In a preferred aspect of this invention, each panelist makes an acceptability judgment. The panelist decides if (i) there is no visual color difference and the color standard-color merchandise are an acceptable match (a "pass" judgment), or (ii) there is a small visual color difference but the color standard-color merchandise are still an acceptable match (a "marginal pass" judgment), or (iii) there is a visual color difference that is unacceptable (a "fail" judgment). Thus, for each color sample-color standard pair there are 4 or 5 determinations corresponding to the number of light sources specified. Each panelist may make independent determinations which are later reconciled or the panel may work as a group to make a consensus determination for each observation. Once all observations have been made, those color sample-color standard pairs that "pass" under all 4 or 5 light sources are deemed to be acceptable colors. The percentage acceptable colors varies for four light sources (e.g., about 85%, preferably about 90%, more preferably about 95% pass/marginal judgments) and five light sources (e.g., about 60%, preferably about 65%, more preferably about 75% pass/marginal judgments).

In one aspect of the invention, the number of light sources is much less important than the actual selected light sources utilized. In other words, the spectral quality of the selected light source(s) will impact on the percentage acceptable colors. For example, the use of F11 will affect the percentage acceptable colors much more than the use of F2. In general, a light source with a very jagged SPD plus radiance at limited narrow band wavelengths, such as F11, will render color matching more challenging.

An inverse relationship has been observed between the acceptance criteria and the percentage of acceptable colors. Acceptable colors are defined as those for which the color sample and the color standard meet acceptability criteria under all illuminants or light sources. As one lowers the acceptable average and maximum $\Delta E$ values, there is a lower percentage ($p_{ins}$) of color standard—color merchandise pairs that pass such more stringent instrumental acceptance criteria. Similarly, as tighter visual tolerance criteria are implemented there is a smaller percentage ($p_{vis}$) of color standard—color merchandise pairs that pass visual acceptance criteria. Accordingly, the acceptance criteria for both instrumental and visual assessments should be correlated so as to optimize the values of $p_{ins}$ and $p_{vis}$. The value of $p_{ins}$ is given by the expression $p_{ins}=n_{ins}/n_{total}$ and the value of $p_{vis}$ is given by the expression $p_{vis}=n_{vis}/n_{total}$, wherein $n_{ins}$ and $n_{vis}$ are the number of color standard—color merchandise pairs that respectively pass instrumental and visual assessments. A balance is preferably achieved to insure that the colors that pass the acceptability requirements meet the customer's needs and expectations but to also insure that a sufficient number of acceptable colors is available to provide a suitable range of color samples. If the acceptance criteria are too tight then there will be too few acceptable colors, if the acceptance criteria are too loose then the colors may be unacceptably metameric.

One should optimize the first acceptance criterion and second acceptance criterion associated with $p_{ins}$ and $p_{vis}$, respectively, to obtain the highest number of printed colors that satisfy both the instrument test and the visual test. One should examine the results of instrumental and visual assessment tests on a color by color basis to determine if the visual results correlate well with the instrumental results. For example, if the acceptability criteria are established at 0.7 CIEDE2000 then it should be true that all colors deemed acceptable by instrumental means were also deemed acceptable by visual means and the total number or percentage of acceptable colors is substantially the same for both visual and instrumental means. If either $p_{ins}$ or $p_{vis}$ is below an optimal tolerance level or they do not correlate well, then one modifies the first acceptance criterion, the second acceptance criterion, or both criteria, until a balance is achieved between criteria values and $p_{ins}$ and $p_{vis}$. In one example, the acceptability criteria comprises an instrument acceptability factor less than 0.7 CIEDE2000 units which correlated well with the visual acceptability evaluation and resulted in a total of about 90% acceptable colors, overall.

Returning back to the discussion of instrumental means of assessment, one is not limited to color difference equations. In alternate embodiments, one may use metamerism indices, root mean square difference equations, or the like in order to evaluate the degree of metamerism. Generally, there are two broad types of metamerism indices: a special index of metamerism and a general index of metamerism. As noted by Imai et al, a special index of metamerism is "a CIE color-difference equation for a test illuminant and observer" and the general index of metamerism calculates "the weighted sum of the absolute differences between two spectra." Imai et al. at 493. Preferably, a metamerism index, as provided by equation (7), is used in the present invention:

$$MI = \sum_{i=1}^{n} w_i \Delta E_i \qquad (7)$$

where $\Delta E$ is the color difference between a color standard and color merchandise, under an illuminant i; $w_i$ is the weighting factor assigned to illuminant i; and n is the number of illuminants. For example, if one uses the Balanced Illuminant (BI), CIE Illuminant D65, CIE Illuminant A, and CIE Illuminant CWF/F2, then equation (7) can be expressed as follows:

$$MI = w_{BI}\Delta E_{BI} + w_{D65}\Delta E_{D65} + w_A \Delta E_A + w_{CWF/F2}\Delta E_{CWF/F2}$$

One can also use mathematical means that do not utilize color difference values. For instance, one can compare the spectral reflectance factors of the color standard and color merchandise by calculating their root mean square (RMS) value as provided in equation (8):

$$\text{RMS} = \frac{1}{n}\sqrt{\sum_{\lambda=380}^{730}(R_{CM}(\lambda) - R_{CS}(\lambda))^2} \qquad (8)$$

where $R_{CM}(\lambda)$ signifies the color merchandise's spectral reflectance and $R_{CS}(\lambda)$ signifies the color standard's spectral reflectance. Herein, n is the number of samples (e.g., n=31), wherein the samples are taken at periodic intervals over the visible light range between about 380 nm and about 780 nm.

Figure 8:
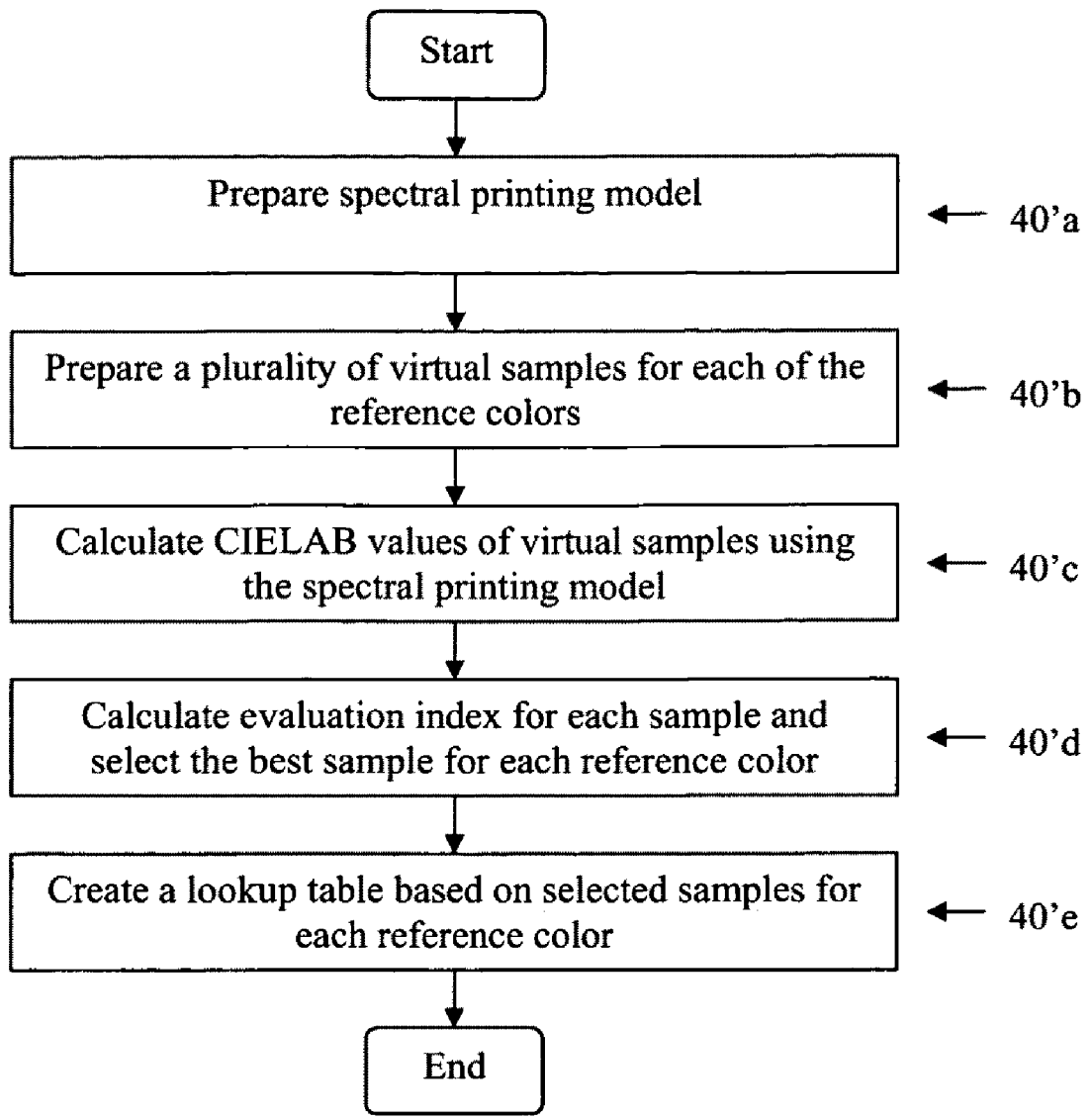
FIG. 8 is a flowchart depicting a method of determining a suitable ink combination that could be used to produce color merchandise.

Returning back to the discussion of step 40 above, it was mentioned that the '169 Publication (see second embodiment, FIG. 21 therein) discloses a method that can be adapted to produce an ink combination that yields color merchandise having a minimal degree of metamerism under different illuminants. This method can be used as an alternative to Methods A, B, and C described above. FIG. 8 is a flowchart schematically illustrating this adapted method, 40', which is preferably executed by a CPU or like computational device. In step 40'a, one establishes a spectral printing model, e.g., the Cellular Yule-Nielsen Spectral Neugebauer model, that can create a virtual spectral reflectance profile for a sample ink amount. See the '169 Publication for an extended discussion about such a spectral printing model.

In step 40'b, a large number of virtual samples are prepared. The term "virtual sample" as used herein refers to a provisional ink combination that is used in the spectral printing model. For example, in a CMYK color model, ink amounts for each of the four inks are set at eleven points at 10% intervals (i.e., each interval represents an increase of ink density by 10%) within the range of 0-100%, and the four inks are combined in all possible permutations to prepare virtual samples (sample ink amount data). As a result, $11^4$ (=14,641)

virtual samples are prepared for each color. "100% ink amount" refers to the amount of ink providing solid coverage with a single ink.

In step 40'c, the sample ink amount data of each virtual sample is converted to a virtual spectral reflectance factor using the model from step 40a, and colorimetric values L*a*b* in the CIELAB color system are calculated based on the spectral reflectance factor In step 40'd, one uses the CIELAB values for each virtual sample together with the CIELAB values of the corresponding color standard (from step 30) to calculate an evaluation index, e.g. the weighted metamerism index provided by equation (7). As noted above, a weighted metamerism index allows one to account for the relative importance of different viewing conditions. Here, as noted above, the primary illuminant (e.g., Balanced Illuminant) is assigned a relative weight that is at least about 1.5, preferably at least about 1.75, more preferably at least about 2.0 more than any other illuminant. Other evaluation indexes, such as one combining a metamerism index with a graininess index (an index measuring noise), may also be used. Based on the calculated values of the evaluation index, one selects the best virtual sample, and its corresponding ink combination, for each color standard. In step 40'e, a color look-up table is populated with ink combinations corresponding to the best virtual samples for each reference color. If, in step 80, it has been determined that the value of either $p_{ins}$ or $p_{vis}$ is less than optimal, then steps 40'a-40'e are repeated but the color look-up table excludes any ink combination that failed either the instrumental or visual tests of assessment.

The present invention can also provide a methodology that provides the customers and other decision makers the ability to make decisions, such as purchase decisions and other selections, based solely on non-verbal and non-textual, non-symbolic or non-hieroglyphic prints on a substrate, discussed in commonly owned co-pending patent application entitled "Apparatus and Method for Dispensing Color Merchandise" U.S. Ser. No. 12/380,745 filed on even date herewith. This commonly owned patent application is incorporated by reference herein in its entirety.

Alternatively, the acceptance criteria, including the instrumental or visual acceptance criteria or both, may include one or more subsets of color standard-color merchandise pairs that are popular with consumers, are recommended by professional designers or paint manufacturers, belong to known color libraries, belong to various color emotions or complement with each others, etc. These sets or subsets of color standard-color merchandise pairs, which are assessed by the instrumental and/or visual acceptance criteria in the present invention, may comprise the top market colors that are popular with consumers in one geographical region or country. For example, this may apply to, but is not limited to, the top 50, 100, 200, or 300 popular market colors or n-number of colors. This concept reflects practical market needs, such as very popular colors (e.g., top 200 market popular colors) or very important colors (e.g., Affinity Colors) that will be frequently printed in the market. For these selected colors, the average CIEDE2000 value could be less than about 0.8, preferably less than about 0.5, and more preferably less than about 0.3. Similarly, the maximum CIEDE2000 value could be less than about 1.3, preferably less than about 1.2, and more preferably less than about 1.0. Including the popular colors in the accepted color standard-color merchandise pairs increases the likelihood that the consumers can print the desired colors on demand.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

The invention claimed is:

1. A method for minimizing metamerism for a set of color standards and color merchandise comprising the steps of:
   (a) providing a set of color standards;
   (b) measuring a spectral reflectance factor of each color standard within said set;
   (c) determining an ink composition corresponding to the spectral reflectance factor of each color standard;
   (d) producing a set of color merchandise with an inkjet printer using said ink compositions;
   (e) measuring a spectral reflectance factor of each color merchandise; and
   (f) evaluating the degree of metamerism for the set of color standards and color merchandise by a sub-method comprising the steps of:
      (i) evaluating the degree of metamerism for a single color standard-color merchandise pair, under a plurality of illuminants, by means of an instrumental test having a first acceptance criterion;
      (ii) returning to step (c) if the single color standard-color merchandise pair has an unacceptable degree of metamerism, under the instrumental test, until an acceptable degree of metamerism is achieved or until it is determined that no optimal solution exists; and
      (iii) repeating steps (i) to (ii) for all other color-standard merchandise pairs in said set
   (g) determining the value of $p_{ins}$, wherein $p_{ins}$ represents the percentage of color standard-color merchandise pairs that pass the instrumental test.

2. The method of claim 1, wherein step (c) comprises a means that assigns relative weights to a plurality of illuminants including at least a balanced illuminant with a correlated color temperature of about 4200 K to about 4600 K.

3. The method of claim 2, wherein the balanced illuminant is assigned a relative weight of at least about 1.5 times the relative weight of the other illuminants.

4. The method of claim 1, wherein step (c) comprises interpolating said ink composition from two or more known ink compositions.

5. The method of claim 1, wherein the number of illuminants is at least four.

6. The method of claim 1, wherein the number of illuminants is at least five.

7. The method of claim 1, wherein the plurality of illuminants are selected from the group consisting of a balanced illuminant with a correlated color temperature of about 4200 K to about 4600 K, CIE Illuminant D65, CIE Illuminant CWF/F2, CIE Illuminant A, and CIE Illuminant F11.

8. The method of claim 1, wherein the instrumental test comprises a CIE color difference equation.

9. The method of claim 8, wherein the CIE color difference equation is the CIEDE2000 color difference equation.

10. The method of claim 9, wherein the first acceptance criterion is an average ΔE value of about 1.0 CIEDE2000 for a 10° observer.

11. The method of claim 1, wherein the number of light sources is at least four, and wherein the value of $p_{ins}$ is at least about 85%.

12. The method of claim 1, wherein the number of light sources is at least five, and wherein the value of $p_{ins}$ is at least about 60%.

13. The method of claim 1 further comprising step (h) modifying the first acceptance criterion if $p_{ins}$ is below an optimal value.

14. A method for minimizing metamerism for a set of color standards and color merchandise comprising the steps of:
    (a) providing a set of color standards;
    (b) measuring a spectral reflectance factor of each color standard within said set;
    (c) determining an ink composition corresponding to the spectral reflectance factor of each color standard;
    (d) producing a set of color merchandise with an inkjet printer using said ink compositions;
    (e) measuring a spectral reflectance factor of each color merchandise; and
    (f) evaluating the degree of metamerism for the set of color standards and color merchandise by a sub-method comprising the steps of:
        (i) evaluating the degree of metamerism for a single color standard-color merchandise pair, under a plurality of illuminants, by means of an instrumental test having a first acceptance criterion;
        (ii) returning to step (c) if the single color standard-color merchandise pair has an unacceptable degree of metamerism, under the instrumental test, until an acceptable degree of metamerism is achieved or until it is determined that no optimal solution exists; and
        (iii) repeating steps (i) to (ii) for all other color-standard merchandise pairs in said set
    wherein step (f) further comprises, before substep (ii), the substep of evaluating the degree of metamerism for a single color standard-color merchandise pair, under a plurality of light sources corresponding to said illuminants, by means of a visual test having a second acceptance criterion, and
    wherein substep (ii) further comprises returning to step (c) if the single color standard-color merchandise pair has an unacceptable degree of metamerism, under either the instrumental test or visual test, until an acceptable degree of metamerism is achieved or until it is determined that no optimal solution exists.

15. The method of claim 14, wherein the visual test comprises an assessment by a panel of at least three observers.

16. The method of claim 15, wherein the second acceptance criterion is a visual pass judgment by each of the observers.

17. The method of claim 1, wherein the set of color standards is a set of paint colors.

18. The method of claim 1, wherein the color merchandise is a paint chip.

19. The method of claim 14 further comprising step (g) determining the value of $p_{ins}$ and $p_{vis}$, wherein $p_{ins}$ represents the percentage of color standard-color merchandise pairs that pass the instrumental test and $p_{vis}$ represents the percentage of color standard-color merchandise pairs that pass the visual test.

20. The method of claim 19 further comprising step (h) modifying the first acceptance criterion, the second acceptance criterion, or both criteria if either $p_{ins}$ or $p_{vis}$ are below an optimal value.

21. The method of claim 19, wherein the number of light sources is at least four, and wherein the value of $p_{vis}$ is at least about 85%.

22. The method of claim 19, wherein the number of light sources is at least five, and wherein the value of $p_{vis}$ is at least about 60%.

23. A method for minimizing metamerism for a set of color standards and color merchandise comprising the steps of:
    (a) providing a set of color standards;
    (b) measuring a spectral reflectance factor of each color standard within said set;
    (c) determining an ink composition corresponding to the spectral reflectance factor of each color standard;
    (d) producing a set of color merchandise with an inkjet printer using said ink compositions;
    (e) measuring a spectral reflectance factor of each color merchandise; and
    (f) evaluating the degree of metamerism for the set of color standards and color merchandise by a sub-method comprising the steps of:
        (i) evaluating the degree of metamerism for a single color standard-color merchandise pair, under a plurality of light sources corresponding to a plurality of illuminants, by means of a visual test having a second acceptance criterion;
        (ii) returning to step (c) if the single color standard-color merchandise pair has an unacceptable degree of metamerism, under the visual test, until an acceptable degree of metamerism is achieved or until it is determined that no optimal solution exists; and
        (iii) repeating steps (i) to (ii) for all other color-standard merchandise pairs in said set
    (g) determining the value of $p_{vis}$, wherein $p_{vis}$ represents the percentage of color standard-color merchandise pairs that pass the visual test.

24. The method of claim 23, wherein the visual test comprises an assessment by a panel of at least three observers.

25. The method of claim 23, wherein the second acceptance criterion is a visual pass judgment by each of the observers.

26. The method of claim 23, wherein the plurality of illuminants are selected from the group consisting of a balanced illuminant with a correlated color temperature of about 4200 K to about 4600 K, CIE Illuminant D65, CIE Illuminant CWF/F2, CIE Illuminant A, and CIE Illuminant F11.

27. The method of claim 23, wherein the number of illuminants is at least four, and wherein the value of $p_{vis}$ is at least about 85%.

28. The method of claim 23, wherein the number of illuminants is at least five, and wherein the value of $p_{vis}$ is at least about 60%.

29. A method for minimizing metamerism for a set of color standards and color merchandise comprising the steps of:
    (a) providing a set of color standards;
    (b) measuring a spectral reflectance factor of each color standard within said set;
    (c) determining an ink composition corresponding to the spectral reflectance factor of each color standard;
    (d) producing a set of color merchandise with an inkjet printer using said ink compositions;
    (e) measuring a spectral reflectance factor of each color merchandise; and
    (f) evaluating the degree of metamerism for the set of color standards and color merchandise by a sub-method comprising the steps of:
        (i) evaluating the degree of metamerism for a single color standard-color merchandise pair, under a plurality of light sources corresponding to a plurality of illuminants, by means of a visual test having a second acceptance criterion;

(ii) returning to step (c) if the single color standard-color merchandise pair has an unacceptable degree of metamerism, under the visual test, until an acceptable degree of metamerism is achieved or until it is determined that no optimal solution exists; and (iii) repeating steps (i) to (ii) for all other color-standard merchandise pairs in said set wherein step (f) further comprises, before substep (ii), the substep of evaluating the degree of metamerism for a single color standard-color merchandise pair, under a plurality of illuminants, by means of an instrumental test having a first acceptance criterion, and wherein substep (ii) further comprises returning to step (c) if the single color standard-color merchandise pair has an unacceptable degree of metamerism, under either the instrumental test or visual test, until an acceptable degree of metamerism is achieved or until it is determined that no optimal solution exists.

* * * * *